3,309,418
PROCESS FOR PRODUCING HEXADIENES
Go Hata, Kamakura-shi, Japan, assignor to Toyo Rayon Kabushiki Kaisha, Chuo-ku, Tokyo, Japan, a corporation of Japan
No Drawing. Filed Nov. 17, 1964, Ser. No. 411,695
Claims priority, application Japan, Nov. 22, 1963, 38/62,514; Jan. 18, 1964, 39/2,177; Feb. 12, 1964, 39/7,155; Mar. 17, 1964, 39/14,583; May 26, 1964, 39/29,323
22 Claims. (Cl. 260—680)

This invention relates to a process for producing hexadienes from ethylene and conjugate diolefinic hydrocarbons. More particularly, the invention relates to a process for producing hexadienes by reacting ethylene with conjugate diolefinic hydrocarbons in the presence of a catalyst composition consisting of an iron compound and an organoaluminum compound.

The hexadienes are compounds having various valuable uses as intermediates. Recently, the 1,4-hexadienes have been attracting attention particularly as the third component for imparting sulfur vulcanizability to the ethylene-propylene copolymer, the so-called ethylene-propylene rubber.

However, most of the processes for producing hexadienes not only required a great number of processing steps but also the cost of the starting materials was high. Thus, the economic value of these processes was low. Recently, there is disclosed in French Patent 1,319,578 a process of producing hexadienes from ethylene or propylene and butadiene. The catalyst used in this process, however, is a very costly one such as rhodium trichloride, and hence the cost of production becomes inevitably high.

An object of the present invention is to provide a process differing from these prior art processes in that the hexadienes are produced from ethylene and conjugate diolefinic hydrocarbons in good yield and moreover with a simple operation by using a novel catalyst system.

Another object of the invention is to provide a process for obtaining the desired hexadienes with high selectivity by the choice of the catalytic components and a selection of the conjugate diolefins.

Namely, the present invention is directed to a process for producing hexadienes which comprises reacting a conjugate diolefinic hydrocarbon with ethylene in the presence of a catalytic amount of a composition consisting of the two components of:

(1) An iron compound, and
(2) An organoaluminum compound selected from the group consisting of (a) the compounds of the formula

wherein R is a monovalent hydrocarbon group, and Z is a group selected from the class consisting of hydrogen and the monovalent hydrocarbon and hydrocarbonoxy groups; and
(b) the compounds of the formula

wherein R' is a monovalent hydrocarbon group, and M is an alkali metal.

Iron compounds to be used as one of the components of the catalyst composition according to the invention process include the di- and trivalent iron salts and chelate compounds. Of these compounds, preferred are the iron chelate compounds, the iron salts of carboxylic acids and the iron (III) halides.

The iron chelate compounds of beta-diketones and beta-ketocarboxylic esters are particularly to be preferred among the iron chelate compounds. Typical of these compounds include, for example, the acetylacetone complexes of iron such as tris(acetylacetonato)iron (III), bis(acetylacetonato)iron (II), monoacetylacetonatoiron (III) dichloride and bis(acetylacetonato)iron (III) monochloride; and tris(benzoylacetonato)iron (III), propionylacetonatoiron (III), iron (III) ethylacetoacetate (enolate) and iron (III) ethylbenzoylacetate (enolate). Further, the most favorable results are obtained from bis(acetylacetonato)iron (II) when it is a compound represented by the formula bis(acetylacetonato)iron (II)·L, where L is a ligand selected from pyridine, amine and water.

On the other hand, suitably used as the iron salts of carboxylic acids are the iron salts of aliphatic and aromatic carboxylic acids. Thus, the iron salts of the aliphatic carboxylic acids are exemplified by the iron salts of the linear saturated monocarboxylic acids such as formic acid, acetic acid, propionic acid, caproic acid, palmitic acid and stearic acid; the iron salts of the linear unsaturated monocarboxylic acids such as acrylic acid, vinylacetic acid, methacrylic acid and 10-undecenoic acid; the iron salts of the linear saturated dicarboxylic acids such as adipic acid, azelaic acid, sebacic acid and decane-1,10-dicarboxylic acid; and the iron salts of linear unsaturated dicarboxylic acid such as muconic acid. Further, typical of the iron salts of the alicyclic carboxylic acids are the iron salts of cyclohexanecarboxylic acid and cyclohexanedicarboxylic acid. On the other hand, as the iron salts of the aromatic carboxylic acids, included are the iron salts of the aromatic monocarboxylic acids such as benzoic acid and naphthalene carboxylic acid and the iron salts of the aromatic dicarboxylic acids such as terephthalic acid, isophthalic acid, phthalic acid and naphthalene dicarboxylic acid. In addition, also usable in like manner are the iron salts of aliphatic carboxylic acids having an aromatic substituent group such as phenylacetic acid and phenylpropionic acid.

According to this invention, particularly preferred of these iron salts of carboxylic acids are those of trivalent iron. Thus, suitably used are such as iron (III) formate, hydrate of iron (III) formate, basic iron (III) acetate, iron (III) stearate and basic iron (III) benzoate. On the other hand, the carboxylic acid, the other component of the iron salt, is preferably an aliphatic monocarboxylic acid, particularly a lower aliphatic carboxylic acid, those suitable being formic acid and acetic acid.

Generally speaking, the divalent iron compounds, when compared with the trivalent compounds, tend to be inferior in their activity when used as catalyst and also with respect to their selectivity of the intended hexadienes. However, the divalent iron salts of lower aliphatic acids can be used as a component of a catalyst system having high activity and high selectivity. Hence, iron (II) acetate is also suitably used in the invention process.

Further, the trivalent iron halides can be utilized to particular advantage in the invention process as the inorganic iron salts. Thus, iron (III) chloride and iron (III) bromide can be used suitably as a catalyst component.

The organoaluminum compound which is used as the other component of the catalyst composition according to the present invention is either (a) a compound of the formula

wherein R is a monovalent hydrocarbon group and Z is a group selected from the class consisting of hydrogen and the monovalent hydrocarbon and hydrocarbonoxy groups, or
(b) a compound of the formula

wherein R' is a monovalent hydrocarbon group, and M is an alkali metal.

In the foregoing formulae, preferably the R is an alkyl group, and particularly an alkyl group of 1–12 carbon atoms, and Z is either hydrogen, an alkyl group of 1–12 carbon atoms, an alkoxy group having 1–12 carbon atoms or phenoxy group. On the other hand, R' is preferably an alkyl group having 1–12 carbon atoms and M is an alkali metal, particularly lithium or sodium. Accordingly, the organoaluminum compounds are exemplified by such as triethylaluminum, tri-n-propylaluminum, triisobutylaluminum, diisobutyl-n-hexylaluminum, tridecylaluminum, diethylaluminum hydride, diisobutylaluminum hydride, diethylaluminum methoxide, diethylaluminum ethoxide, diisobutylaluminum ethoxide, diisobutylaluminum phenoxide, lithium aluminum tetraethyl, lithium aluminum tetraisobutyl, lithium aluminum tetradecyl and sodium aluminum tetraethyl.

Examples of suitable combinations of the foregoing catalyst components include such as tris(acetylacetonato) iron (III) and the trialkylaluminums such as triethylaluminum and triisobutylaluminum; tris(acetylacetonato) iron (III) and diethylaluminum alkoxide or phenoxide; bis(acetylacetonato)iron (II)·2 pyridine and triethylaluminum; iron (III) ethylacetonatoacetate (enolate) and trialkylaluminum; iron (III) formate and diisobutylaluminum hydride; and iron (II) acetate and triethylaluminum. Further, when iron (III) halogenides are used, the combination of iron (III) chloride and lithium aluminum tetraoctyl is a particularly excellent one among the many combinations available.

Although the optimum conditions as to the molar ratio of the aforesaid two components to be added for constituting the catalyst composition according to the invention will vary depending upon the combinations used of the two components, generally speaking, desirable results can be obtained when the organoaluminum compound is used at the ratio of one or more mols to each mol of the iron compound. Although there is no upper limit as to the foregoing molar ratio of the organoaluminum compound to the iron compound, from the standpoint of economy and ease of management, a ratio of less than 200 is preferred.

While each of these catalyst components may be added directly to the reaction system, it is an advantage if the two are mixed and prepared in advance of their addition. These catalytic components may be mixed with or without a solvent, but since a catalyst of especially great activity can be obtained when the mixing is carried out in the presence of a conjugate diolefinic hydrocarbon, such as 1,3-butadiene of an alkyl-substituted 1,3-butadiene, one of the components of the starting material of the invention process, in mixing the two catalyst components, the presence of these conjugate diolefinic hydrocarbons is to be preferred.

In addition, an inert solvent is desirably used in mixing these catalyst components, since this solvent functions as a medium in the reaction which follows, with the consequence that the reaction proceeds smoothly.

The inert solvents used in this invention for preparing the catalyst composition and in carrying out the reaction between ethylene and the conjugate diolefinic hydrocarbons include the aliphatic hydrocarbons, aromatic hydrocarbons, ethers and halogenated aromatic hydrocarbons. Thus, suitably used are the normally liquid aliphatic hydrocarbons such as pentane, heptane, petroleum benzine and kerosene; the ethers such as diethyl ether, diethoxyethane and tetrahydrofuran; the normally gaseous aliphatic saturated hydrocarbons such as propane, butane, isobutane and neopentane and the halogenated aromatic hydrocarbons such as chlorobenzene, bromobenzene, iodobenzene, chlorotoluene, bromotoluene, chloroxylene, bromoxylene and dichlorobenzene.

When these halogenated aromatic hydrocarbons are used, the isomerization of the resulting 1,4-hexadienes can be restrained and hence the selectivity of 1,4-hexadienes is enhanced. Again, when the normally gaseous aliphatic saturated hydrocarbons are used, the treatment after the reaction is simplified.

The conjugate diolefinic hydrocarbons which are used as the starting material in the present invention, together with ethylene, are either 1,3-butadiene or the alkyl- or aryl-substituted 1,3-butadienes. Of these compounds, those suitably used in the invention process are 1,3-butadiene and the 2-alkyl-1,3-butadienes, 4-alkyl-1,3-butadienes, 2,3-dialkyl-1,3-butadienes and 2,4-dialkyl-1,3-butadiene (the alkyl groups here indicated are those of 1–20 carbon atoms, and preferably 1–6 carbon atoms). Thus, as typical compounds can be mentioned 1,3-butadiene, isoprene, 2-ethyl-1,3-butadiene, 1,3-pentadiene, 1,3-hexadiene, 2,3-dimethyl-1,3-butadiene, 2,3-diethyl-1,3-butadiene and 2-methyl-1,3-pentadiene. Moreover, as aryl-substitute-1,3-butadiene, 2-phenyl-1,3-butadiene may be used.

Needless to say, ethylene and 1,3-butadiene or the alkyl-substituted 1,3-butadienes react stoichiometrically, but these two components need not necessarily be present in the reaction system in an equivalent relationship. For instance, if, as previously mentioned, in preparing the catalyst, the 1,3-butadiene or the alkyl-substitued 1,3-butadiene is all added in advance to the system, the reaction can be carried out by merely introducing the ethylene.

While the amount of catalyst used with respect to these starting materials will vary depending upon the particular catalyst system used, generally speaking, it is preferred that the iron compound is used normally in an amount of 0.00001–0.2 molar equivalent, particularly 0.0005–0.02 molar equivalent, based on the conjugate diolefinic hydrocarbon.

According to the invention process, no special restrictions are imposed as to the reaction temperature and pressure as well as other reaction conditions, it being possible to vary these conditions within wide limits.

With reference to the suitable range of these conditions, a range of between $-10°$ and $180°$ C., and preferably between $10°$ and $90°$ C., is appropriate for the reaction temperature. On the other hand, while a feature of this invention is that it can be carried out at atmospheric pressure, the reaction is suitably carried out while applying a pressure of 30–300 kg./cm.$^2$ with ethylene.

The desired hexadienes can be synthesized by suitably varying the conditions within the ranges indicated hereinabove of the present invention. The relationship between the conjugate diolefinic hydrocarbons used and the resulting hexadienes are, in general, as follows:

(1) 1,3-butadiene→1,4-hexadiene, 2,4-hexadiene, 1,3-hexadiene.
(2) 2-alkyl-1,3-butadiene→5-alkyl-1,4-hexadiene, 4-alkyl-1,4-hexadiene, 2-alkyl-2,4-hexadiene, 3-alkyl-2,4-hexadiene.
(3) 4-alkyl-1,3-butadiene→3-alkyl-1,4-hexadiene, 6-alkyl-1,4-hexadiene, 3-alkyl-2,4-hexadiene, 6-alkyl-2,4-hexadiene.
(4) 2,3-dialkyl-1,3-butadiene→4,5-dialkyl-1,4-hexadiene, 2,3-dialkyl-2,4-hexadiene.
(5) 1,4-dialkyl-1,3-butadiene→4,6-dialkyl-1,4-hexadiene, 3,5-dialkyl-1,4-hexadiene.
(6) 2-phenyl-1,3-butadiene→4-phenyl-1,4-hexadiene.

The proportion with which the products are obtained from the same starting material can be varied over a broad range by means of the choice and combination of the catalyst components, the choice of solvent as previously noted, and changes in the reaction conditions.

For a clearer understanding of the present invention, the following examples are given. Unless otherwise indicated, the percentages are on a weight basis.

*Example 1*

A 100-cc. autoclave replaced with notrogen is charged with 0.5 g. of tris(acetylacetonato)iron (III) and 5 cc. of toluene. To this are then added 4 cc. of diethylaluminum ethoxide dissolved in 10 cc. of toluene. Next, after adding 50 cc. of butadiene, the mixture is applied a pressure of 30 kg./cm.$^2$ with ethylene and stirred for 3 days at 20° C. Since the pressure gradually decreases, ethylene is frequently added to maintain the pressure at 30 kg./cm.$^2$. When the contents of the autoclave are then taken out, decomposed with methanol and dilute hydrochloride acid, followed by washing the oil layer with sodium bicarbonate solution and water and then distilled, 16.5 g. of 1,4-hexadiene (B.P. 66.5° C., $n_D^{20}$ 1.4147) are obtained.

*Example 2*

When the same procedures as described in Example 1 are followed except that the reaction temperature is 50° C., the ethylene pressure is 50 kg./cm.$^2$ and the reaction time is 16 hours, 12.3 g. of 1,4-hexadiene are obtained.

*Example 3*

A 100-cc. autoclave is charged with 0.5 g. of tris(acetylacetonato)iron (III) and 10 cc. of ethyl ether, after which are added further 4 cc. of diethylaluminum ethoxide dissolved in 5 cc. of ethyl ether. Next, after adding 50 cc. of butadiene, a pressure of 50 kg./cm.$^2$ is applied with ethylene and the stirring of the mixture is carried out for 30 hours at 30° C. Some 8.2 g. of 1,4-hexadiene are obtained.

*Example 4*

A 100-cc. autoclave is charged with 0.5 g. of tris(acetylacetonato)iron (III) and 5 cc. of tetrahydrofuran, following which are added further 4 cc. of diethylaluminum ethoxide dissolved in 5 cc. of tetrahydrofuran. Next, after adding 50 cc. of butadiene, a pressure of 30 kg./cm.$^2$ is applied with ethylene and the stirring of the mixture is continued for 3 days at 20° C. A large amount of n-heptane is then added to the reaction product and after extracting the tetrahydrofuran with water, distillation is carried out. Here 14.9 g. of 1,4-hexadiene are obtained:

*Examples 5–9*

The reactions are carried out as in Example 1 except that instead of the diethylaluminum ethoxide used therein the organoaluminum compounds indicated in the following table are used to obtain 1,4-hexadiene in the amounts as tabulated below.

*Example 10*

A 100-cc. autoclave is charged with 10 cc. of toluene, 1.4 g. (12 mmols) of triethylaluminum and 50 cc. of liquefied butadiene. To this mixture are added further 1.06 g. (3 mmols) of tris(acetylacetonato)iron (III) dissolved in 10 cc. of toluene. The mixture is then stirred for 1.5 hours at 30° C. while applying a pressure of 40 kg./cm.$^2$ with ethylene. Some 15.6 g. of 1,4-hexadiene and 0.9 g. of 2,4-hexadiene are thereby obtained.

*Example 11*

An agitating type 100-cc. autoclave containing 40 cc. of monochlorobenzene is charged with 40 cc. of liquefied butadiene. Two millimols of tris(acetylacetonato)iron (III) and 1 cc. (7.3 mmols) of triethylaluminum are mixed therein, after which the autoclave is sealed. The reaction is then carried out for 2 hours at 40° C. by applying a pressure of 24–40 kg./cm.$^2$ with ethylene. The remaining ethylene is discharged and a small quantity of methanol is added to the reaction product to deactivate the catalyst. Fractional distillation affords 14.4 g. of hexadienes, of which 82% is 1,4-hexadiene.

*Example 12*

A 100-cc. autoclave is charged with 0.5 g. of iron (III) ethylacetoacetate (enolate) and 5 cc. of toluene, after which are added further 4 cc. of diethylaluminum ethoxide dissolved in 10 cc. of toluene. Next, when after adding 30 cc. of butadiene, a pressure of 30 kg./cm.$^2$ is applied with ethylene and the stirring of the mixture is carried out for two days at 40° C., 5.2 g. of 1,4-hexadiene are obtained.

*Example 13*

When instead of the iron (III) ethylacetoacetate (enolate) of Example 12 0.5 g. of tris(propionylacetonate)iron (III) are used therein, 8.6 g. of 1,4-hexadiene are obtained.

*Examples 14–16*

Bis(acetylacetonato)iron (II)·3/2 H$_2$O is synthesized in accordance with the process of R. Jarczynski et al.: Chem. Ber., 64B 1072–6 (1931).

A 100-cc. autoclave is charged with 1.42 millimols of bis(acetylacetonato)iron (II)·3/2 H$_2$O, triethylaluminum in the amounts indicated in the following table, 20 cc. of toluene and 60 cc. of butadiene, following which the reactions were carried out for 18 hours at room temperature by introducing ethylene under a pressure of 40 kg./cm.$^2$ to obtain the hexadienes in the amounts shown in Table II.

TABLE II

| Example | Molar Ratio of Al/Fe | Yield of Product and Proportion Thereof | | | | | | | | |
|---|---|---|---|---|---|---|---|---|---|---|
| | | 1,4-hexadiene | | 1,3-hexadiene | | 2,4-hexadiene | | 3-M.H.T.[1] | | Residue | |
| | | G. | Percent | G. | Percent | G. | Percent | G. | Percent | G. | Percent |
| 14 | 2.6 | 0.7 | 58.2 | 0 | 0 | 0 | 0 | Trace | | 0.5 | 41.8 |
| 15 | 3.9 | 7.8 | 59.4 | 0.5 | 3.8 | 0.4 | 2.7 | 0.6 | 4.3 | 3.9 | 29.8 |
| 16 | 5.1 | 9.4 | 58.9 | 0.6 | 3.9 | 0.30 | 1.9 | 0.7 | 4.6 | 5.0 | 31.2 |

[1] 3-methyl-1,4,6-heptatriene.

TABLE I

| Example | Organoaluminum compound, cc. | Yield of 1,4-hexadiene, g. |
|---|---|---|
| 5 | Dihexylaluminum butoxide, 4 | 15.3 |
| 6 | Diethylaluminum phenoxide, 4 | 8.6 |
| 7 | Tridecylaluminum, 2 | 1.8 |
| 8 | Diisobutyl-n-hexylaluminum, 1 | 2.3 |
| 9 | Diisobutylaluminum hydride, 1 | 7.4 |

*Examples 17–20*

Bis(acetylacetonato)iron (II)·2 pyridine is likewise synthesized by the process of R. Jarczynski et al.

The reactions are carried out exactly as in Example 14 except that 0.4 g. of bis(acetylacetonato)iron (II)·2 pyridine and triethylaluminum in the amounts indicated in the following table are used at the temperatures indicated therein. As a result, the hexadienes indicated in the said table are obtained.

TABLE III

| Example | AlEt₃, cc. | Temperature, °C. | Yield of Product and Proportion Thereof | | | | | | | | | |
|---|---|---|---|---|---|---|---|---|---|---|---|---|
| | | | 1,4-hexadiene | | 2,4-hexadiene | | 3-M.H.T. | | Octatriene | | Residue | |
| | | | G. | Percent | G. | Percent | G. | Percent | G. | Percent | G. | Percent |
| 17 | 0.5 | 25 | 10.8 | 56.9 | 0.3 | 1.5 | 0.5 | 2.6 | 0 | | 7.0 | 36.9 |
| 18 | 0.95 | 25 | 15.9 | 56.0 | 0.6 | 2.0 | 1.1 | 3.6 | 0 | | 10.0 | 35.3 |
| 19 | 1 | 25 | 19.4 | 52.1 | 1.9 | 5.0 | 1.8 | 4.9 | 0 | | 14.2 | 38.1 |
| 20 | 2 | 50 | 16.4 | 41.2 | 0.8 | 2.0 | 3.2 | 8.0 | 1.5 | 3.7 | 16.9 | 42.8 |

*Example 21*

Iron (III) chloride and acetylacetonatosodium are reacted in a ratio of 1:1 in benzene to afford a dark brown powder, monoacetylacetonateiron (III) dichloride.

Then 0.45 g. of monoacetylacetonatoiron (III) dichloride, 1.1 cc. of triethylaluminum and 20 cc. of butadiene are mixed in 60 cc. of monochlorobenzene, and then after applying a pressure of 40 kg./cm.² with ethylene, the mixture is, with stirring, reacted for 17 hours at 50° C. Some 4.9 g. of hexadienes are obtained, of which only about 8% are conjugate dienes.

*Example 22*

Iron (III) chloride and acetylacetonatosodium are reacted in benzene in a ratio of 1:2 to afford a dark brown powder, bis(acetylacetonato)iron (III) monochloride.

Two millimols of this bis(acetylacetonato)iron (III) monochloride and 6 millimols of triethylaluminum are mixed in 20 cc. of toluene in the presence of 60 cc. of butadiene. A pressure of 40 kg./cm.² is then applied with ethylene and the reaction is carried out for 17 hours at 50° C. Here 3.7 g. of hexadienes are obtained, of which 96% is 1,4-hexadiene.

*Example 23*

A 100-cc. autoclave replaced with nitrogen is charged with 25 cc. of benzene, 3 cc. of diethylaluminum ethoxide and 16.4 g. of 2,3-dimethyl-1,3-butadiene. To this mixture are added 0.3 g. of tris(acetylacetonato)iron (III) dissolved in 5 cc. of benzene. The reaction is then carried out with stirring for 1 hour and 20 minutes at 50° C. by applying a pressure of 40 kg./cm. with ethylene. The reaction product is hydrolyzed with methanol and hydrochloric acid solution. As a result of distillation, 1.5 g. of unreacted 2,3-dimethyl-1,3-butadiene, 14.1 g. of 4,5-dimethyl-1,4-hexadiene (B.P. 119–120° C., $n_D^{20}$ 1.4407), 1.7 g. of 2,3-dimethyl-2,4-hexadiene (B.P. 137–139° C., $n_D^{20}$ 1.4803) and 1.5 g. of high boiling residue are obtained.

*Example 14*

When the reaction is carried out using 0.3 g. of iron (III) ethylacetoacetate (enolate) instead of the tris(acetylacetonato)iron (III) of Example 23, 2.5 g. of unreacted 2,3-dimethyl-1,3-butadiene, 13.6 g. of 4,5-dimethyl-1,4-hexadiene and 0.8 g. of 2,3-dimethyl-2,4-hexadiene are obtained.

*Example 25*

A 100-cc. autoclave replaced with nitrogen is charged with 5 cc. of xylene and 0.3 g. of tris(acetylacetonato)iron (III). To this is then added further a mixture of 10 cc. of xylene, 3 cc. of diethylaluminum ethoxide and 20.4 g. of isoprene. Next, a pressure of 20 kg./cm.² is applied with ethylene and the reaction is carried out with stirring for 24 hours at 20° C. When the reaction product is hydrolyzed with dilute hydrochloric acid and the oil layer is distilled after drying with anhydrous sodium sulfate, 0.9 g. of unreacted isoprene, 13.6 g. of a mixture of 4- and 5-methyl-1,4-hexadienes (B.P. 88–89° C.) and 7.9 g. of residue are obtained. As a result of tests, this mixture is found to consist of 60% of 4-methyl-1,4-hexadiene ($n_D^{20}$ 1.4248) and 40% of 5-methyl-1,4-hexadiene ($n_D^{20}$ 1.4256).

*Example 26*

A 100-cc. autoclave is charged with 10 cc. of xylene, 20.4 g. of isoprene and 3 cc. of diethylaluminum ethoxide, after which 0.3 g. of tris(acetylacetonato)iron (III) dissolved in 5 cc. of xylene are added to the foregoing mixture. The reaction is then carried out with stirring for 2 hours and 30 minutes while applying a pressure of 40 kg./cm.² with ethylene. The isoprene is completely reacted and 16.1 g. of a mixture of 4- and 5-methyl-1,4-hexadienes are obtained. The composition of this mixture consists of 62.4% of 4-methyl-1,4-hexadiene and 37.6% of 5-methyl-1,4-hexadiene.

*Example 27*

When the same procedure as described in Example 26 are followed except that the reaction temperature is 80° C. and the reaction time is 30 minutes, 13.5 g. of a mixture of 4- and 5-methyl-1,4-hexadienes are obtained, of which the proportions of 4-methyl-1,4-hexadiene and 5-methyl-1,4-hexadiene are 56.1% and 43.9%, respectively.

*Example 28*

A 100-cc. autoclave is charged with 10 cc. of xylene, 20.4 g. of isoprene and 3 cc. of diethylaluminum ethoxide, following which are added further 0.3 g. of tris(acetylacetonato)iron (III) dissolved in 5 cc. of xylene. When the autoclave is then cooled to 0° C., a pressure of 32 kg./cm.² is applied thereto with ethylene and stirring of the mixture is continued for 24 hours at 0° C., and 13.3 g. of unreacted isoprene, and 1.9 g. of a mixture of 4- and 5-methyl-1,4-hexadienes are obtained.

*Example 29*

A 100-cc. autoclave is charged with 10 cc. of xylene, 0.5 cc. of triethylaluminum and 20.4 g. of isoprene. To this are then added 0.5 g. of tris(acetylacetonato)iron (III) dissolved in 5 cc. of xylene. The reaction is carried out for 18 hours at 20° C. by applying a pressure of 40 kg./cm.² with ethylene. Isoprene is completely reacted, and 15.3 g. of a mixture of 4- and 5-methyl-1,4-hexadienes are obtained.

*Example 30*

A 100-cc. autoclave is charged with 10 cc. of xylene, 3 cc. of diethylaluminum ethoxide and 20.4 g. of isoprene, to which are then added 0.3 g. of tris(acetylacetonato)iron (III) dissolved in 5 cc. of xylene. When the reaction is continued, with stirring, for 24 hours at 20° C. while maintaining the pressure at 6 kg./cm.² with ethylene, 7.6 g. of unreacted isoprene, 12.4 g. of a mixture of 4- and 5-methyl-1,4-hexadienes and 4.6 g. of a residue are obtained.

*Example 31*

When the reaction is carried out as in Example 29 except that diisobutylaluminum hydride is used instead of the triethylaluminum, 14.8 g. of a mixture of 4- and 5-methyl-1,4-hexadienes are obtained.

*Examples 32 and 33*

The reactions are carried out as in Example 25 except that the organoaluminum compounds set forth in the following table are used instead of the diethylaluminum ethoxide of Example 25 to obtain a mixture of 4- and 5-methyl-1,4-hexadienes at the yields shown in said table.

TABLE IV

| Ex. | Organoaluminum Compound | Yield of the Mixture of 4- and 5-methyl-1,4-hexadienes, g. |
|---|---|---|
| 32 | Diethylaluminum phenoxide, 4 cc | 9.4 |
| 33 | Diisobutyl-n-hexylaluminum, 3 cc | 4.9 |

*Example 34*

A 100-cc. autoclave is charged with 1.0 g. of lithium aluminum tetraethyl, 10 cc. of xylene and 20.4 g. of isoprene. To this are then added 0.2 g. of tris(acetylacetonato)iron (III) dissolved in 5 cc. of xylene. When the mixture is stirred for 2 hours at 50° C. under ethylene pressure of 40 kg./cm.$^2$, all of isoprene is reacted and 16.4 g. of a mixture of 4- and 5-methyl-1,4-hexadienes are obtained.

*Examples 35 and 36*

Methyl hexadienes are synthesized by reacting isoprene with ethylene. A 100-cc. autoclave is charged with 40 cc. of chlorobenzene, 2 millimols of the iron compounds listed in the table below, 20 cc. (13.6 g.) of isoprene and 1 cc. AlEt$_3$. After sealing the autoclave, the temperature is raised to 50° C. and the pressure of the ethylene is adjusted to 40 kg./cm.$^2$. By reacting for 1.5 hours, the results shown in Table V are obtained.

TABLE V

| Example | Iron Compound | Methyl Hexadienes | | | Conjugate Dienes, g. |
|---|---|---|---|---|---|
| | | Yield, g. | Percentage of 4-methyl-1,4-hexadiene | Percentage of 5-methyl-1,4-hexadiene | |
| 35 | Fe(CH$_3$COCHCOCH$_3$)$_3$ | 5.3 | 41.5 | 54.4 | 4.1 |
| 36 | Fe(CH$_3$COCHCOOC$_2$H$_5$)$_3$ | 9.8 | 36 | 63 | 1 |

*Example 37*

Except that 0.3 g. of tris(propionylacetonato)iron (III) are used instead of the tris(acetylacetonato)iron (III) of Example 29, the reaction is carried out as in said example to obtain 13.8 g. of a mixture of 4- and 5-methyl-1,4-hexadienes.

*Example 38*

A 100-cc. autoclave is charged with 5 cc. of xylene, 3 cc. of triethylaluminum and 20.4 g. of isoprene. Then 0.5 g. of iron (III) ethylacetoacetate (enolate) dissolved in 10 cc. of xylene are also added. When the reaction is then carried out with stirring for 2 hours at 50° C. under ethylene pressure of 60 kg./cm.$^2$, 4.0 g. of unreacted isoprene and 15.6 g. of a mixture of 4- and 5-methyl-1,4-hexadienes are obtained.

*Example 39*

Three mols of a monosodium salt of benzoyl acetone and one mol of anhydrous iron (III) chloride are mixed in ethyl ether and 0.6 g. of the resulting red precipitate are dissolved in 10 cc. of xylene, following which this solution is added to a solution consisting of 5 cc. of xylene, 1 cc. of triethylaluminum and 20.4 g. of isoprene. When this mixture is stirred for 3 hours at 30° C. under an ethylene pressure of 20 kg./cm$^2$, 15 g. of unreacted isoprene and 6.5 g. of a mixture of 4- and 5-methyl-1,4-hexadienes are obtained.

*Example 40*

A 100-cc. autoclave is charged with 10 cc. of xylene, 10 cc. of tri-n-hexylaluminum and 24.6 g. of 2-ethyl-1,3-butadiene, to which are added further 0.5 g. of iron (III) ethylacetoacetate (enolate). When this mixture is then reacted for 24 hours while applying a pressure of 20 kg./cm$^2$ with ethylene, 13.4 g. of a mixture of 4- and 5-ethyl-1,4-hexadienes are obtained.

*Example 41*

A 100-cc. autoclave is charged with 15 cc. of xylene, 25 g. of 2-pentyl-1,3-butadiene and 3 cc. of diethylaluminum ethoxide, after which are added further 0.4 g. of tris(acetylacetonato)iron (III) dissolved in 5 cc. of xylene. When the reaction is then carried out for 24 hours at 30° C. while applying a pressure of 25 kg./cm$^2$ with ethylene, 11.8 g. of a mixture of 4- and 5-pentyl-1,4-hexadienes are obtained.

*Example 42*

A 100-cc. autoclave replaced with nitrogen is charged with 30 cc. of xylene, 3 cc. of diethylaluminum ethoxide and 22.7 g. of 1,3-pentadiene (purity 90%). To this are also added 0.3 g. of tris(acetyl-acetonato)iron (III) dissolved in 20 cc. of xylene. Then, after replacing the nitrogen in the autoclave with ethylene, the reaction is carried out with stirring for 48 hours at 20° C. by applying a pressure of 15 kg./cm$^2$ with ethylene. During the reaction, care is exercised to ensure that the ethylene pressure is maintained at 15 kg./cm$^2$. After completion of the reaction, the contents of the autoclave are taken out and are decomposed with methanol and dilute hydrochloric acid. When the oil layer is washed with a sodium bicarbonate solution and water and thereafter subjected to distillation, 5.8 g. of unreacted 1,3-pentadiene, 7.6 g. of 3-methyl-1,4-hexadiene (B.P. 83° C., $n_D^{20}$ 1.4169) and 1.9 g. of 1,4-heptadiene (B.P. 93° C.) are obtained.

*Examples 43 and 44*

Except that the ethylene pressure, reaction temperature and time used are those set forth in the following Table VI, the reactions are otherwise carried out as in Example 42 to obtain the products set forth in said table.

TABLE VI

| Example | Pressure, kg./cm.$^2$ | Reaction Temperature, °C. | Reaction Time, min. | 3-methyl-1,4-hexadiene, g. | 1,4-heptadiene, g. | Unreacted 1,3-pentadiene, g. |
|---|---|---|---|---|---|---|
| 43 | 40 | 90 | 30 | 6.8 | 1.6 | 5.7 |
| 44 | 40 | 130 | 10 | 1.8 | 0.8 | 11.4 |

*Example 45*

A 100-cc. autoclave is charged with 5 cc. of ethyl ether, 30 g. of 1,3-pentadiene and 4 cc. of diethylaluminum ethoxide, after which are added further 0.5 g. of tris(acetylacetonato)iron (III) dissolved in 10 cc. of ethyl ether. When this mixture is then stirred for 23 hours at 50° C. while applying a pressure of 40 kg./cm$^2$ with ethylene, 8.8 g. of unreacted 1,3-pentadiene, 11.3 g. of 3-methyl-1,4-hexadiene and 1.0 g. of 1,4-heptadiene are obtained.

Example 46

A 100-cc. autoclave is charged with 15 g. of 1,3-pentadiene and 4 cc. of diethylaluminum ethoxide, after which are added further 0.5 g. of tris(acetylacetonato) iron dissolved in 5 g. of 1,3-pentadiene. Then the mixture is stirred for 48 hours at 25° C. while applying a pressure of 40 kg./cm$^2$ with ethylene, thus obtaining 2.7 g. of unreacted 1,3-pentadiene, 9.3 g. of 3-methyl-1,4-hexadiene, 1.9 g. of 1,4-heptadiene and 2.6 g. of 2,4-heptadiene.

Example 47

A 100-cc. autoclave is charged with 25 cc. of xylene, 6 cc. of diethylaluminum ethoxide and 22.7 g. of 1,3-pentadiene. To this are then added further 0.5 g. of tris(benzoylacetonato)iron (III) dissolved in 5 cc. of xylene. When the reaction is then carried out for 48 hours at 20° C. by applying a pressure of 10 kg./cm$^2$ with ethylene, 9 g. of unreacted 1,3-pentadiene, 5.6 g. of 3-methyl-1,4-hexadiene and 1.8 g. of 1,4-heptadiene are obtained.

Example 48

A 100-cc. autoclave is charged with 25 cc. of xylene, 2 cc. of triethylaluminum and 22.7 g. of 1,3-pentadiene, after which are added further 0.4 g. of iron (III) ethylacetoacetate (enolate). When this mixture is then stirred for 24 hours at 50° C. while applying a pressure of 40 kg./cm$^2$ with ethylene, 7.6 g. of unreacted 1,3-pentadiene, 6.8 g. of 3-methyl-1,4-hexadiene and 1.7 g. of 1,4-heptadiene are obtained.

Examples 49 and 50

The reactions are carried out as in Example 48 except that the organoaluminum compounds indicated in the following table are used instead of the triethylaluminum of Example 48, with the consequence that the products set forth in said table are obtained.

TABLE VII

| Example | Organoaluminum compound | (1) 3-methyl-1,4-hexadiene, g. | (2) 1,4-heptadiene, g. | Unreacted 1,3-pentadiene, g. |
|---------|------------------------|------------------------------|----------------------|------------------------------|
| 49 | Diisobutyl-n-hexylaluminum | 5.3 | 1.5 | 8.6 |
| 50 | Diethylaluminum phenoxide | Mixture of (1) and (2) 6.2 | | 8.4 |

Example 51

Except that 1 cc. of diisobutylaluminum hydride and 0.3 g. of tris(acetylacetonato)iron (III) are used instead of the triethylaluminum and iron (III) ethylacetoacetate (enolate), respectively, of Example 48, otherwise the reaction was carried out for 9 hours with stirring, as described therein, to obtain 2.3 g. of unreacted 1,3-pentadiene, 4.5 g. of 3-methyl-1,4-hexadiene and 1.5 g. of 1,4-heptabutadiene.

Example 52

A 100-cc. autoclave is charged with 25 cc. of xylene, 1.5 g. of lithium aluminum tetraethyl and 22.7 g. of 1,3-pentadiene, to which are then added also 0.3 g. of tris(acetylacetonato)iron (III). When this mixture is then stirred for 48 hours at 20° C. under ethylene pressure of 40 kg./cm.$^2$, 2.4 g. of unreacted 1,3-pentadiene, 10.4 g. of 3-methyl-1,4-hexadiene and 1.9 g. of 1,4-heptadiene are obtained.

Example 53

A 100-cc. autoclave is charged with 5 cc. of xylene, 24.6 g. of 1,3-hexadiene and 0.3 g. of tris(acetylacetonato)iron (III), after which are added further 3 cc. of diethylaluminum ethoxide dissolved in 25 cc. of xylene. When this mixture is reacted for 24 hours at 30° C. by applying a pressure of 20 kg./cm.$^2$ with ethylene, 10.3 g. of unreacted 1,3-hexadiene, 7.1 g. of a mixture of 3-ethyl-1,4-hexadiene and 1,4-octadiene are obtained.

Example 54

A 100-cc. autoclave is charged with 10 cc. of xylene, 25 g. of 1,3-octadiene and 0.4 g. of tris(acetylacetonato)iron (III), to which are added further 3 cc. of diethylaluminum ethoxide dissolved in 20 cc. of xylene. When this mixture is reacted for 24 hours at 50° C. by applying a pressure of 35 kg./cm.$^2$ with ethylene, 8.2 g. of a mixture of 3-butyl-1,4-hexadiene and 1,4-decadiene are obtained.

Example 55

A 100-cc. autoclave replaced with nitrogen is charged with 5 cc. of toluene and 1.0 g. of iron (III) formate (monohydrate). Then 27 g. of butadiene are distilled into the autoclave. The autoclave is cooled with Dry Ice and then 3 cc. of triethylaluminum dissolved in 10 cc. of toluene are added to the autoclave from its small inlet hole. The mixture is then stirred for 24 hours at 40° C. while applying a pressure of 40 kg./cm.$^2$ with ethylene, after which the unreacted ethylene and butadiene are removed, and the residue is hydrolyzed with methanol and an aqueous hydrochloric acid solution, thereby yielding 3.2 g. of 1,4-hexadiene and 0.2 g. of 2,4-hexadiene.

Example 56

A rotating type 200-cc. autoclave is charged, in the order given, with 80 cc. of monochlorobenzene, 0.5 of iron (II) acetate, 20 cc. of liquefied butadiene and 1 cc. of triethylaluminum filled in an ampoule. After sealing the autoclave, pressure is applied with ethylene, the adjustment being such that it becomes 40 kg./cm.$^2$ at 50° C.

Upon vigorous stirring, the ampoule is broken and the reaction is started. After continuing the stirring for 1 hour, the pressure is relieved, after which methanol is added to stop the reaction. Some 9.5 g. of 1,4-hexadiene and 1.8 g. of 2,4-hexadiene are formed. The by-products obtained are 0.5 g. of a dimer of butadiene and 4.8 g. of high boiling substances.

Example 57

When only the solvent in Example 56 is changed to toluene, but otherwise the reaction is carried out as described therein, 1.7 g. of 1,4-hexadiene and 7.6 g. of 2,4-hexadiene are formed. The hexadiene selectivity of the product is 68%.

Example 58

One hundred cc. of the so-called BB fraction (a mixture of 1,3-butadiene, isobutene, n-butene, isobutane and n-butane) containing about 36% of butadiene are placed in an autoclave and then after mixing in the catalyst component as in Example 56, the reaction is carried out for 1 hour at 50° C. by applying pressure of 40 kg./cm.$^2$ with ethylene, with the consequence that 3.6 g. of 1,4-hexadiene are obtained.

Example 59

A 100-cc. autoclave is charged with 5 cc. of toluene, 0.5 g. of basic iron (III) benzoate and 20.4 g. of isoprene. To this mixture are further added 3 cc. of triethylaluminum dissolved in 10 cc. of xylene. The mixture is then stirred for 24 hours while applying a pressure of 40 kg./cm.$^2$ with ethylene. Some 8.2 g. of unreacted isoprene, 6.5 g. of a mixture of 4- and 5-methyl-1,4-hexadienes and 0.4 g. of conjugate dienes having 7 carbon atoms are thus obtained.

Example 60

When the reaction of Example 59 is carried out for 24 hours at 50° C., using 0.5 g. basic iron (III) acetate instead of basic iron (III) benzoate, 12.1 g. of unreacted isoprene and 3.6 g. of a mixture of 4- and 5-methyl-1,4-hexadienes are obtained.

Example 61

A 100-cc. autoclave is charged with 2.0 g. of lithium aluminum tetraethyl and 10 cc. of xylene. To this are then added further 0.5 g. of iron (III) formate suspended in 20.4 g. of isoprene. When this mixture is reacted for 5 hours at 50° C. by applying a pressure of 40 kg./cm.$^2$ with ethylene, isoprene reacts completely and 16.3 g. of a mixture of 4- and 5-methyl-1,4-hexadienes and 3.2 g. of conjugate dienes having 7 carbon atoms are obtained.

Example 62

A 100-cc. autoclave is charged with 0.5 g. of iron (III) formate, 5 cc. of xylene and 20.4 g. of isoprene. To this mixture are then added 3 cc. of diisobutylaluminum hydride dissolved in 10 c. of xylene. The reaction is then carried out for 5 hours at 50° C. by applying a pressure of 40 kg./cm.$^2$ with ethylene here. 5.1 g. of unreacted isoprene and 11.4 g. of a mixture of 4- and 5-methyl-1,4-hexadienes are obtained.

Example 63

A 100-cc. autoclave is charged with 0.8 g. of iron (III) chloride, 1.2 g. of sodium acetate and 20 cc. of ethyl ether, after which the resultant mixture is heated for 3 hours at 100° C. Next, 20.4 g. of isoprene and 3 cc. of triethylaluminum dissolved in 5 cc. of ethyl ether are added to this system. When the reaction is then carried out for 6 hours at 50° C. by applying a pressure of 40 kg./cm.$^2$ with ethylene, isoprene reacts completely, and 14.3 g. of a mixture of 4- and 5-methyl-1,4-hexadienes and 4.3 g. of conjugate dienes having 7 carbon atoms are obtained.

Example 64

A rotating type 200 cc. autoclave is charged with 40 cc. of monochlorobenzene, 2 millimols of iron (II) acetate, 20 cc. of isoprene and 2 cc. of triisobutylaluminum, and then after raising the temperature to 50° C., the reaction is carried out by applying a pressure of 40 kg./cm.$^2$ with ethylene for 15 hours. Some 9.8 g. of a mixture of 4- and 5-methyl-1,4-hexadienes are obtained. Methyl-2,4-hexadienes, which are isomers of the foregoing products, are formed in an amount of about 1 gram.

Example 65

A 100-cc. autoclave is charged with 0.3 g. of iron (III) formate and 5 cc. of xylene, to which are added further a mixture of 6 cc. of diethylaluminum ethoxide, 10 cc. of xylene and 22.7 g. of 1,3-pentadiene. The mixture is then stirred for 43 hours at 80° C. while applying a pressure of 40 kg./cm.$^2$ with ethylene to obtain 15.3 g. of unreacted 1,3-pentadiene, 5 g. of 3-methyl-1,4-hexadiene and 2.3 g. of 1,4-heptadiene.

Example 66

An autoclave replaced with nitrogen is charged with 20 cc. of a xylene solution containing 7.4 millimols of lithium aluminum tetraoctyl. The autoclave is then cooled with a Dry Ice-methanol solution, after which it is charged with 30 cc. of liquefied butadiene by distillation. Then 0.17 g. of iron (III) chloride dissolved in 10 cc. of ethyl ether are added from a small orifice of the autoclave, after which stirring is carried out for 10 hours at 40° C. while applying a pressure of 40 kg./cm.$^2$ with ethylene. After the stirring is stopped, the autoclave is cooled to room temperature and the residual ethylene is discharged. Methanol and dilute hydrochloric acid are added to the reaction product to decompose the catalyst. By distilling the oil layer of the decomposed product, 11.9 g. of 1,4-hexadiene and 1.0 g. of 2,4-hexadiene are obtained.

Example 67

Twenty cc. of a xylene solution containing 9.7 millimols of lithium aluminum tetraoctyl are placed in a 100-cc. autoclave, to which are then charged 50 cc. of liquefied butadiene by distillation. Also added into the autoclave from its small orifice are 0.5 g. of iron (III) bromide, along with 10 cc. of ethyl ether. When the reaction is carried out for 9 hours at 40° C. by applying a pressure of 40 kg./cm.$^2$ with ethylene, 11.4 g. of unreacted butadiene, 12.1 g. of 1,4-hexadiene and 0.03 g. of 2,4-hexadiene are obtained.

Example 68

7.4 millimols of sodium aluminum tetraethyl, along with 20 cc. of xylene, are placed in a 100-cc. autoclave. Next, 20.4 g. of isoprene and 10 cc. of an ether solution containing 0.17 g. of iron (III) chloride are added. The mixture is then stirred for 5 hours at 50° C. while applying a pressure of 40 kg./cm.$^2$ with ethylene. Isoprene is completely reacted and 16.1 g. of a mixture of 4- and 5-methyl-1,4-hexadienes and 2.3 g. of conjugate diene having 7 carbon atoms are thus obtained.

Example 69

A 100-cc. autoclave is charged with 22.7 g. of 1,3-pentadiene (purity 90%), 1 g. of lithium aluminum tetraethyl and 20 cc. of xylene. Then to this mixture are added 0.17 g. of iron (III) chloride, along with 10 cc. of xylene. When this mixture is stirred for 24 hours at 50° C. while applying a pressure of 40 kg./cm.$^2$ with ethylene, 5.7 g. of unreacted 1,3-pentadiene, 6.2 g. of 3-methyl-1,4-hexadiene and 1.8 g. of 1,4-heptadiene are obtained.

Example 70

A 100-cc. autoclave is charged with 20 cc. of benzene, 1.1 g. (10 millimols) of triethylaluminum and 17.2 g. of 2-methyl-1,3-pentadiene, following which are added further 0.35 (1 millimol) of tris(acetylacetonato)iron (III) dissolved in 5 cc. of benzene. The stirring is then carried out for 3 hours while maintaining the ethylene pressure and reaction temperature at 40 kg./cm.$^2$ and 50° C. respectively. Here 9.7 g. of unreacted 2-methyl-1,3-pentadiene, 5.2 g. of 3,5-dimethyl-1,4-hexadiene (B.P. 108° C.) and 1.8 g. of 4-methyl-1,4-heptadiene (B.P. 116° C.) are thus obtained.

Example 71

A 100-cc. autoclave is charged with 10 cc. of toluene, 1.1 g. of triethylaluminum and 23 g. of 2-phenyl-1,3-butadiene, followed by adding further 0.53 g. of tris-(acetylacetonato)iron (III) dissolved in 5 cc. of toluene. The stirring is then carried out for 2 hours while maintaining the ethylene pressure and reaction temperature at 40 kg./cm.$^2$ and 40° C., respectively. The 2-phenyl-1,3-butadiene is completely reacted, and 14.6 g. of 4-phenyl-1,4-hexadiene (B.P. 88° C./10 mm. Hg) are obtained.

I claim:
1. A process for producing hexadienes which comprises reacting a conjugate diolefinic hydrocarbon with ethylene in the presence of a catalytic amount of a composition consisting of the two components of:
   (1) an iron compound and

(2) an organoaluminum compound selected from the group consisting of
(a) the compounds of the formula $$R_2AlZ$$

wherein R is a monovalent hydrocarbon group, and Z is a group selected from the class consisting of hydrogen and the monovalent hydrocarbon and hydrocarbonoxy groups; and
(b) the compounds of the formula $$R'_4AlM$$

wherein R' is a monovalent hydrocarbon group, and M is an alkali metal.

2. The process according to claim 1 wherein said conjugate diolefinic hydrocarbon is 1,3-butadiene.

3. The process according to claim 1 wherein said conjugate diolefinic hydrocarbon is an alkyl-substituted 1,3-butadiene, said alkyl group having 1 to 20 carbon atoms.

4. The process according to claim 3 wherein said alkyl-substituted 1,3-butadiene is a 2-alkyl-1,3-butadiene.

5. The process according to claim 3 wherein said alkyl-substituted 1,3-butadiene is a 4-alkyl-1,3-butadiene.

6. The process according to claim 1 wherein said conjugate diolefinic hydrocarbon is an aryl-substituted 1,3-butadiene.

7. The process according to claim 1 wherein the molar ratio of said organoaluminum compound to said iron compound ranges between one and 200 mols for the former to each mol of the latter.

8. The process according to claim 1 wherein said iron compound is present in an amount of 0.00001 to 0.1 molar equivalent, based on said conjugate diolefinic hydrocarbon.

9. A process for producing hexadienes which comprises reacting a conjugate diolefinic hydrocarbon with ethylene in the presence of a composition consisting of the two components of:
(1) a chelate compound of iron, and
(2) an organoaluminum compound selected from the group consisting of
(a) the compounds of the formula $$R_2AlZ$$

wherein R is a monovalent hydrocarbon group, and Z is a group selected from the class consisting of hydrogen and the monovalent hydrocarbon and hydrocarbonoxy groups; and
(b) the compounds of the formula $$R'_4AlM$$

wherein R' is a monovalent hydrocarbon group, and M is an alkali metal;
said components (1) and (2) being contained in said composition such that the molar ratio thereof ranges between one and 200 mols for the latter to each mol of the former, said component (1) being present in an amount of 0.00001 to 0.1 molar equivalent, based on said conjugate diolefin.

10. The process according to claim 9 wherein said chelate compound of iron is a beta-diketone complex of iron.

11. The process according to claim 9 wherein said chelate compound of iron is a beta-ketocarboxylic acid ester complex of iron.

12. The process according to claim 9 wherein said conjugate diolefin is 1,3-butadiene.

13. The process according to claim 9 wherein said conjugate diolefin is isoprene.

14. A process for producing hexadienes which comprises reacting a conjugate diolefinic hydrocarbon with ethylene in the presence of a composition consisting of the two components of:
(1) an iron salt of a carboxylic acid, and
(2) an organoaluminum compound selected from the group consisting of
(a) the compounds of the formula $$R_2AlZ$$

wherein R is a monovalent hydrocarbon group, and Z is a group selected from the class consisting of hydrogen and the monovalent hydrocarbon and hydrocarbonoxy groups; and
(b) the compounds of the formula $$R'_4AlM$$

wherein R' is a monovalent hydrocarbon group, and M is an alkali metal;
said components (1) and (2) being contained in said composition such that the molar ratio thereof ranges between one and 200 mols for the latter to each mol of the former, said component (1) being present in an amount of 0.00001 to 0.1 molar equivalent, based on said conjugate diolefin.

15. The process according to claim 14 wherein said iron salt of a carboxylic acid is an iron salt of an aliphatic monocarboxylic acid.

16. The process according to claim 15 wherein said iron salt of an aliphatic monocarboxylic acid is an iron salt of a lower monocarboxylic acid.

17. The process according to claim 14 wherein said conjugate diolefin is 1,3-butadiene.

18. The process according to claim 14 wherein said conjugate diolefin is isoprene.

19. A process for producing hexadienes which comprises reacting a conjugate diolefinic hydrocarbon with ethylene in the presence of a composition consisting of the two components of;
(1) an iron (III) halide, and
(2) an organoaluminum compound selected from the group consisting of
(a) the compounds of the formula $$R_2AlZ$$

wherein R is a monovalent hydrocarbon group, and Z is a group selected from the class consisting of hydrogen and the monovalent hydrocarbon and hydrocarbonoxy groups; and
(b) the compounds of the formula $$R'_4AlM$$

wherein R' is a monovalent hydrocarbon group, and M is an alkali metal;
said components (1) and (2) being contained in said composition such that the molar ratio thereof ranges between and one and 200 mols for the latter to each mol of the former, said component (1) being present in an amount of 0.00001 to 0.1 molar equivalent, based on said conjugate diolefin.

20. The process according to claim 19 wherein said conjugate diolefin is 1,3-butadiene.

21. The process according to claim 19 wherein said conjugate diolefin is isoprene.

22. The process according to claim 19 wherein said iron (III) halide is iron (III) chloride.

References Cited by the Examiner
UNITED STATES PATENTS

| | | | |
|---|---|---|---|
| 2,349,173 | 5/1944 | Joshel | 260—666 |
| 2,599,249 | 6/1952 | Friedman | 260—680 |
| 3,152,195 | 10/1964 | Verbanc | 260—680 |

DELBERT E. GANTZ, *Primary Examiner.*

G. E. SCHMITKONS, *Assistant Examiner.*